United States Patent
Pudney

(10) Patent No.: US 8,170,566 B2
(45) Date of Patent: May 1, 2012

(54) TELECOMMUNICATIONS NETWORK

(75) Inventor: Christopher David Pudney, Newbury (GB)

(73) Assignee: Vodafone Group PLC, Newbury, Berkshire (GB)

(*) Notice: Subject to any disclaimer, the term of this patent is extended or adjusted under 35 U.S.C. 154(b) by 495 days.

(21) Appl. No.: 12/226,837

(22) PCT Filed: May 2, 2007

(86) PCT No.: PCT/GB2007/001607
§ 371 (c)(1),
(2), (4) Date: Jun. 25, 2009

(87) PCT Pub. No.: WO2007/129045
PCT Pub. Date: Nov. 15, 2007

(65) Prior Publication Data
US 2009/0305707 A1    Dec. 10, 2009

(30) Foreign Application Priority Data
May 2, 2006 (GB) .................................. 0608612.8

(51) Int. Cl.
*H04W 40/00* (2009.01)
(52) U.S. Cl. ........................................ 455/445; 370/392
(58) Field of Classification Search .................. 455/432, 455/435, 436, 445; 370/392
See application file for complete search history.

(56) References Cited

U.S. PATENT DOCUMENTS
7,693,506 B1* 4/2010 Back et al. .................... 455/436
2004/0013116 A1* 1/2004 Greis et al. .................... 370/392

FOREIGN PATENT DOCUMENTS
EP        1 009 176 A2    6/2000
WO       WO 00/14981      3/2000
WO       WO 01/97548 A1   12/2001

* cited by examiner

Primary Examiner — Kent Chang
Assistant Examiner — Kashif Siddiqui
(74) Attorney, Agent, or Firm — Muirhead and Saturnelli, LLC

(57) ABSTRACT

A method of controlling selection of a data transmission network node, such as a base station, node B, eNodeB, GGSN or LTE PDN-GW, for a mobile device in a telecommunications network is disclosed. The mobile telecommunications network includes a plurality of mobility management nodes, such as SGSN and LTE MME. When the mobile terminal moves from a first one of the mobility management nodes to a second of the nodes, it is determined at the second node whether to cause the mobile terminal to re-select a data transmission network node. The determining step may be performed in response to a periodic routing area/periodic tracking area update request generated by the mobile terminal or in response to the mobile terminal being in an idle communication state. When the data transmission network node is re-selected, a data transmission network node that is relatively geographically near to the mobile terminal is selected.

32 Claims, 5 Drawing Sheets

TELECOMMUNICATIONS NETWORK

FIELD OF THE INVENTION

This application relates to a method of controlling selection of a data transmission node for a mobile device in a mobile telecommunications network and to a mobile telecommunications network.

BACKGROUND TO THE INVENTION

Currently 2G (GSM), 2.5G (GPRS) and 3G (UMTS/UTRA) mobile or cellular telecommunications networks (PLMNs) co-exist. A development of the radio access network part of 3G mobile telecommunications is "evolved" UTRA or E-UTRA, also referred to as LTE (Long Term Evolution). "System Architecture Evolution" (SAE) is the development of the core network part of 3G mobile telecommunications. The combined core network and radio network development is sometimes referred to as SAE/LTE. It is desirable for mobile terminals to provide continuous service also when moving from an LTE coverage area to a 3G or 2G coverage area.

With current GPRS/UMTS packet switched (PS) networks, the GGSN is selected when the PDP context is activated. This is described in 3GPP TS 23.060, which is fully incorporated herein by reference, see particularly Annex A: APN and GGSN Selection.

The PLMN operator may configure the network to select a GGSN that is close to where the mobile device is when a PDP context is activated. However, if a subscriber keeps their mobile device switched on and moves a large physical distance, sub-optimal routing of data traffic can occur.

A corresponding problem also exists for SAE/LTE networks in relation to Packet Data Network Gateway (PDN-GW) selection.

SUMMARY OF THE INVENTION

According to the system described herein, there is provided a method of controlling selection of a data transmission node for a mobile device in a mobile telecommunications network including a network core and a radio access network, wherein the network core comprises a plurality of mobility management nodes and said data transmission nodes, the method characterised by, while the mobile device is attached to the network, determining whether to cause the mobile device to re-select data transmission node.

The determining step may selectively cause re-selection of the data transmission node in dependence upon a calculation of an indication of the distance of the data transmission node from the mobile terminal, from the mobility management node, or from the radio access network.

The network may be a GSM/UMTS network or an SAE/LTE network.

In the embodiments the network is divided into a plurality of areas. In the embodiments the areas are paging areas, such as routing areas or the equivalent thereof (for example LTE "tracking areas"). The areas are collections of cells, each cell being served by a particular base station/access point. Such areas are provided because, as is known to those skilled in the art, and as is discussed briefly below, this provides efficient paging of mobile terminals.

BRIEF DESCRIPTION OF THE DRAWINGS

For a better understanding of the system described herein embodiments will now be described by way of example, with reference to the accompanying drawings, in which.

In the drawings like elements are generally designated with the same reference sign.

DETAILED DESCRIPTION OF VARIOUS EMBODIMENTS

Figure 1:
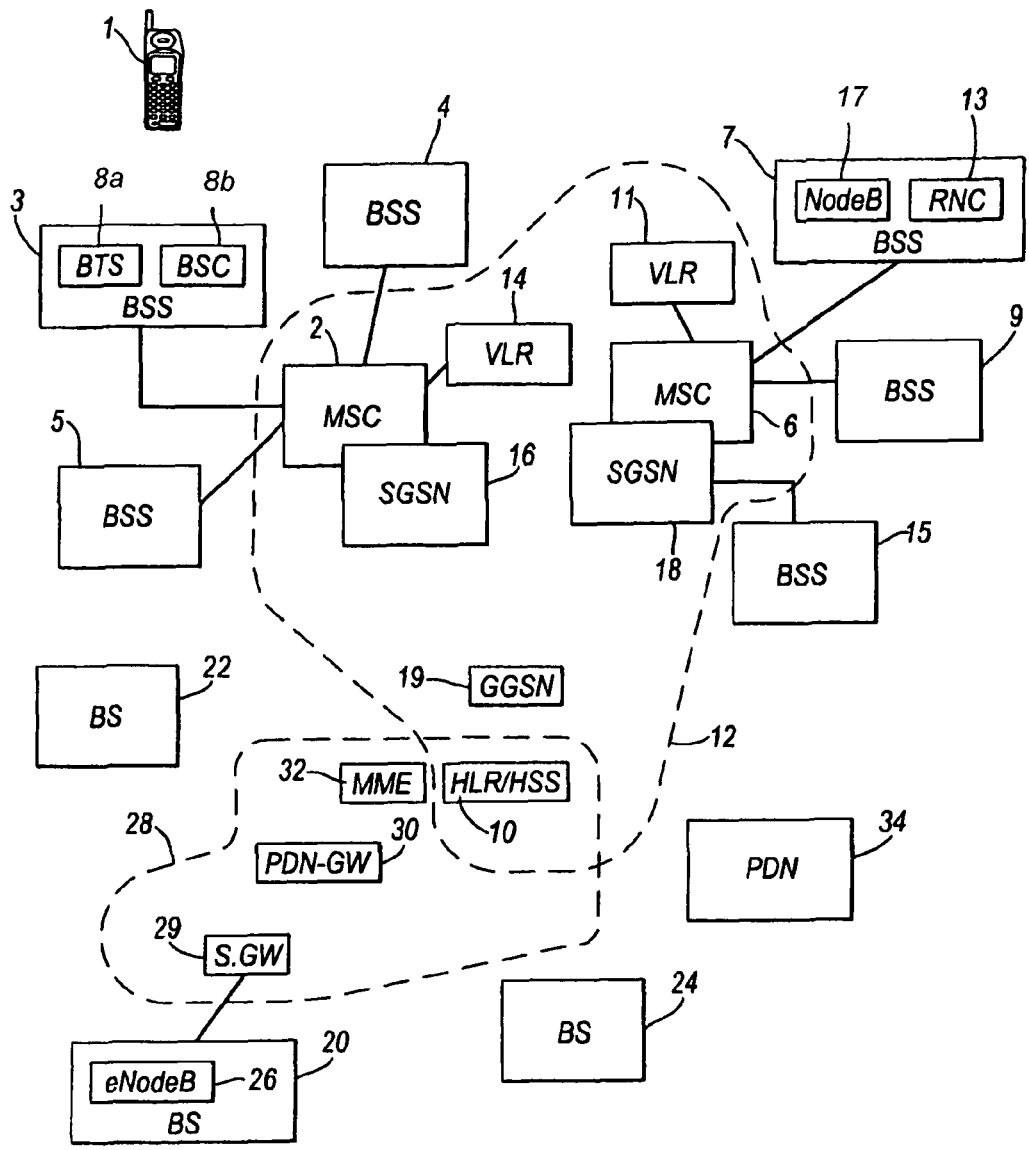
FIG. 1 is a diagrammatic drawing of certain elements of a mobile telecommunications network for use in explaining the operation of such a network.

Certain elements of a mobile telecommunications network, and its operation, will now briefly be described with reference to FIG. 1.

Each base station (BS) corresponds to a respective cell of its cellular or mobile telecommunications network and receives calls/data from and transmits calls/data to a mobile terminal in that cell by wireless radio communication in one or both of the circuit switched or packet switched domains. Such a subscriber's mobile terminal (or User Equipment-UE) is shown at 1. The mobile terminal may be a handheld mobile telephone, a personal digital assistant (PDA), a laptop computer equipped with a datacard, or a laptop computer with an embedded chipset containing the UE's functionality.

In a GSM (2G) mobile telecommunications network, each base station subsystem (BSS) 3 comprises one or more base transceiver stations (BTS) 8a and a base station controller (BSC) 8b. A BSC may control more than one BTS. The BTSs and BSCs comprise the GSM radio access network (RAN).

In a UMTS (3G) mobile telecommunications network, a radio network controller (RNC) 13 may control more than one node B 17. The node B's and RNC's comprise the radio access network (RAN).

Conventionally, the base stations are arranged in groups and each group of base stations is controlled by one mobile switching centre (MSC), such as MSC 2 for base stations in BSSs 3, 4 and 5. As shown in FIG. 1, the network has another MSC 6, which is controlling a further three BSSs 7, 9 and 15. In practice, the network will incorporate many more MSCs and base stations than shown in FIG. 1.

Each subscriber to the network is provided with a smart card or SIM which, when associated with the user's mobile terminal identifies the subscriber to the network. The SIM card is pre-programmed with a unique identification number, the "International Mobile Subscriber Identity" (IMSI) which is not visible on the card and is not known to the subscriber. The subscriber is issued with a publicly known number, that is, the subscriber's telephone number, by means of which calls to the subscriber are initiated by callers. This number is the MSISDN.

The network includes a home location register (HLR)/home subscriber server (HSS) 10 which, for each subscriber to the network, stores the IMSI and the corresponding MSISDN together with other subscriber data, such as the current or last known location of the subscriber's mobile terminal. The HSS is the master database for the network, and while logically it is viewed as one entity, in practice it will be made up of several physical databases. The HSS holds variables and identities for the support, establishment and maintenance of calls and sessions made by subscribers. As well as the basic HLR/authentication functions, the HSS may be enhanced through the use of additional databases and reference points. This enables the network to offer the subscriber advanced services and features by interfacing with service application servers based on CAMEL, OSA (Open Service Access) and SIP.

When the subscriber wishes to activate their mobile terminal in a network (so that it may make or receive calls subsequently), the subscriber places their SIM card in a card reader associated with the mobile terminal (terminal 1 in this example). The mobile terminal 1 then transmits the IMSI (read from the card) to the base station 3 associated with the particular cell in which the terminal 1 is located. In a traditional network, the base station 3 then transmits this IMSI to the MSC 2 with which the BSS 3 is associated. In a network using the functionality described in 3GPP TS 23.236, the base station follows prescribed rules to select which MSC to use, and then transmits this IMSI to the selected MSC.

MSC 2 now accesses the appropriate the HLR/HSS 10 and extracts the corresponding subscriber MSISDN and other subscriber data from the appropriate storage location, and stores it temporarily in a location in a visitor location register (VLR) 14. In this way, therefore the particular subscriber is effectively registered with a particular MSC (MSC 2), and the subscriber's information is temporarily stored in the VLR (VLR 14) associated with that MSC. The information stored on the VLR 14 includes a Temporary Mobile Subscriber Identification (TMSI) number for identification purposes for the terminal within the MSC 2. The TMSI number is an identification number that is typically 32 bits in length. In conventional systems, therefore, the TMSI number is not allocated to more than one user of a given system served by that MSC at one time. Consequently, the TMSI number is usually invalidated when the mobile station crosses into a new location served by a different MSC.

When the HLR 10 is interrogated by the MSC 2 in the manner described above, the HLR 10 additionally causes an authentication procedure to be performed on the mobile terminal 1. The HLR 10 transmits authentication data to the MSC 2 in "challenge" and "response" pairs. Using this data, MSC 2 passes a "challenge" to the mobile terminal 1 through base station 3. Upon receipt of this data, the mobile terminal 1 passes this data to its SIM and the SIM produces a "response". This response is generated using an authentication algorithm on the SIM and a unique Ki on the SIM. The response is transmitted back to the MSC 2 which checks it against the "response" that the MSC 2 received from the HLR 10. If the response from the mobile terminal 1 is as expected, the mobile terminal 1 is deemed authenticated. At this point the MSC 2 requests subscription data from the HLR 10. The HLR 10 then passes the subscription data to the VLR 14.

The authentication process will be repeated at regular intervals while the mobile terminal 1 remains activated and can also be repeated each time the mobile terminal makes or receives a call, if required.

Each of the MSCs of the network (MSC 2 and MSC 6) has a respective VLR (14 and 11) associated with it and operates in the same way as already described when a subscriber activates a mobile terminal in one of the cells corresponding to one of the base stations controlled by that MSC.

When the subscriber using mobile terminal 1 wishes to make a call, having already inserted the SIM card into the reader associated with this mobile terminal and the SIM has been authenticated in the manner described, a call may be made by entering the telephone number of the called party in the usual way. This information is received by the base station 3 and passed on to the MSC 2. The MSC 2 routes the calls towards the called party via the MSC 2. By means of the information held in the VLR 14, MSC 2 can associate the call with a particular subscriber and thus record information for charging purposes.

The MSCs 2 and 6 support communications in the circuit switched (CS) domain—typically voice calls. Corresponding SGSNs 16 and 18 are provided to support communications in the packet switched (PS) domain—such as GPRS data transmissions. The SGSNs 16 and 18 function in an analogous way to the MSCs 2 and 6. The SGSNs 16, 18 are equipped with an equivalent to the VLR for the packet switched domain. GGSN 19 provides IP connectivity to the internet and/or private intranets.

When mobile terminal 1 attaches to the network, the SGSN 16 checks data transmitted from the SIM with data retrieved from the HLR/HSS 10 in order to authenticate the mobile terminal, in the manner described above in relation to the MSC 2. The transmission of PS data is then authorised by using the Access Point Name (APN) to help select a GGSN and activating a PDP context. The SGSN may provide the APN to a DNS server, and the DNS server may then return a list of GGSNs. The SGSN 2 sends a request for a PDP context to the GGSN 19. The GGSN 19, or an associated server provides an appropriate IP address to the mobile terminal 1.

When switched on, a mobile terminal has an active mode, an idle mode. In the GPRS specifications, the idle mode is referred to as the "standby" mode; the active mode is referred to as the "ready" mode; and GPRS-idle means that the terminal is switched off. In 3G the idle mode is referred to as the "PMM idle" mode and the active mode is referred to as the "PMM connected" mode. In LTE the idle mode is referred to as the "LTE idle" mode and the active mode is referred to as the "LTE active" mode.

When a calling party (whether a subscriber within the mobile telecommunications network or outside it) attempts to call a mobile terminal within the network, that mobile terminal must be paged. Paging is a process of broadcasting a message which alerts a specific mobile terminal to take some action—in this example, to contact the network and, after the exchange of some signalling, notify the terminal that there is an incoming call to be received. If the network knows in which cell the mobile terminal is located, it is only necessary to page in that cell. However, if the mobile terminal is moving within the network, the precise cell in which the mobile terminal is located may not be known. It will therefore be necessary to perform paging in a number of cells. The greater the number of cells in which paging must occur, the more use of valuable signalling capacity within the network.

However, if the MSC is to always have an up-to-date record of the cell in which each mobile terminal is located so that the current cell which is occupied by a terminal is always known, this will require a large amount of location updating signalling between the mobile terminal and the MSC in order that the MSC has up-to-date records of the cells occupied by each mobile terminal. This is also wasteful of valuable signalling capacity.

As indicated above, the HLR is updated each time a mobile terminal moves from the coverage area of one MSC to another MSC and from one SGSN to another SGSN. However, typically the area covered by a single MSC and SGSN is large, and to page all the cells covered by a single MSC and SGSN would require a significant amount of paging signalling.

The problems of excessive use of signalling capacity by paging a multiplicity of cells or performing a multiplicity of frequent location updates is solved in a known manner in 2G and 3G networks by dividing the coverage area of the mobile telecommunications network into a plurality of location areas (LAs) and into a plurality of routing areas (RAs).

A location area relates to a particular geographical area for communications in the circuit-switched domain. Typically, although not necessarily, a location area is larger than the area of a single cell but is smaller than the area covered by one MSC. Each cell within the network broadcasts data indicative of the identity of its location area (LAI). The mobile terminal uses this data to determine when it has moved into a new location area. The terminal stores its last known location area on its SIM. This information stored on the SIM is compared with the location area information broadcast by the local cell. The identities of the two location areas are compared. If they are different, the mobile terminal determines that it has entered a new location area. The mobile terminal then gains access to a radio channel and requests a location area update (LAU). The request includes the now out-of-date LAI and the terminal's current TMSI. If the MSC/VLR is the same for the new and old location areas, the network can immediately authenticate the mobile terminal and note the change of location area. However, if the mobile terminal is moved to a different MSC/VLR, the MSC/VLR addresses a message to the HSS/HLR. The HSS/HLR notes the new location and downloads security parameters to allow the network to authenticate the mobile. It also passes on subscription details of the user to the new VLR and informs the old VLR to delete its records. The new MSC/VLR allocates a new TMSI to the mobile.

A routing area relates to a particular geographical area for communications in the packet-switched domain. Typically, although not necessarily, a routing area is larger than the area of a single cell but is smaller than the area covered by one SGSN. A routing area is typically, although not necessarily, smaller than a location area. There may be many routing areas within one location area. Each cell within the network broadcasts data indicative of its routing area (RAI) in addition to the data mentioned above indicative of the identity of its location area. The mobile terminal uses this received data to determine when it has moved to a new routing area. The terminal stores the last known routing area on its SIM. The information stored on the SIM is compared with the routing area information broadcast by the local cell. The identities of the two routing areas are compared. If they are different, the mobile terminal determines that it has entered a new routing area. The mobile terminal then gains access to a radio channel and requests a routing area update (RAU). The routing area is updated in the same manner as the location area, as discussed above.

In addition to the LAU and RAU performed in the manner described above—as a result of movement of the mobile terminal or signal fade—the network also instructs each mobile terminal to periodically (at regular intervals) report its location (its LA or RA) to the network by the mobile terminal performing a Periodic Location/Routing Area Update (PLAU or PRAU). The network provides each mobile terminal registered therewith with an instruction, indicating the frequency with which PLAUs/PRAUs should be performed. Typically all mobile terminals registered with a network will be instructed to perform such updates at the same frequency—for example, every 60 minutes. A PLAU/PRAU timer starts counting when the mobile terminal enters the idle state. If the active state is entered the timer is re-set, and begins counting again from its initial value when the idle state is entered again. Thus, a PLAU/PRAU is only performed if the mobile terminal is idle for more than 60 minutes (in this example).

The primary purpose of the PLAU or PRAU sent by the mobile terminal is to provide the network with an indication that the mobile terminal is still registered and active. During these procedures, the Radio Access network provides the current serving cell's identity to the MSC and/or SGSN. If the network does not receive a PLAU or PRAU then, after a first extra timer expires, it need not page the mobile, and after, typically, a much larger time passes, it may purge the mobile terminal's subscription information from the VLR.

Elements of an LTE network are shown in FIG. 1. The base stations 20,22 and 24 comprise an eNodeB (evolved Node B) 26. The RRC signalling with the mobile terminal 1 terminates at the eNodeB 26, the eNode B comprising the RAN of the LTE network. The eNodeB 26 performs the functions of both the Node B and a large part of the RNC of the 3G/UMTS network. The network core 28 of the LTE network includes Serving Gateway (S-GW) 29, Packet Data Network Gateway (PDN-GW) 30, the HLR/HSS 10 (a common HLR/HSS shared with the network core 12 of the GSM/UMTS network) and also Mobility Management Entity (MME) 32. A plurality of PDN-GWs are usually provided, although only one is shown.

Although shown separately in FIG. 1, the PDN-GW 30 and GGSN 19 may be combined to form a single element.

Both the GSM/UMTS and LTE networks can communicate with an external packet data network PDN 34.

Communications between the mobile terminal 1 and the network cores 12, 28 can be considered to be split into a control plane and a user plane. The control plane performs the required signaling, and includes the relevant application protocol and the signaling bearer for transporting the application protocol messages. Among other things, the application protocol is used for setting up the radio access bearer in the radio network layer. The user plane transmits data traffic and includes data streams and data bearers for the data streams. The data streams are characterized by one or more frame protocols specified for that interface. Generally speaking, the user plane carries data for use by a receiving terminal—such as data that allows a voice or picture to be reproduced—and the control plane controls how the data is transmitted.

As discussed above, GSM and UMTS mobile telecommunications networks are divided into location areas/routing areas. The LTE network has the equivalent of location/routing areas (herein "tracking areas", TAs). Tracking area (including periodic TA updates, PTAUs) updates are performed in a broadly similar manner to RAUs and URA updates. These Tracking area updates are performed with the MME 32. An additional Periodic Session Management Update may be performed by the terminal with the PDN-GW 30. A decision in this regard has not yet been made by the relevant Standards bodies.

The size and position of the tracking areas may be different from the size and area of the LAs and RAs.

When there is a pause in data flow between the UE 1 and eNodeB 26 of a Is particular duration, it is desirable for the LTE idle state to be entered.

Both the UE 1 and the eNodeB 26 include a timer. These timers begin counting when data flow between the UE 1 and the eNodeB 26 pauses. When the timer of the UE 1 reaches a predetermined value, the UE 1 enters the LTE idle mode. When the timer of the eNodeB 26 reaches a predetermined value, the eNodeB 26 records that UE 1 has entered the LTE idle mode. The period between each of the timers beginning counting and reaching their respective predetermined value is the timer duration. When the eNodeB 26 timer reaches its predetermined value it causes a signalling message in step 3 to be passed to the MME 32 which informs the MME 32 that the network shall regard UE 1 as being in the LTE idle mode. The MME 32 then advises the or each PDN-GW 30 that the UE 1 is in the LTE idle mode.

As discussed above, embodiments of the system described herein are concerned with controlling or changing the GGSN/PDN-GW used by a mobile terminal.

This may be advantageous when a mobile terminal moves away geographically from its original position at the time of PDP context activation. At PDP context activation an appropriate GGSN 19 will be selected in the conventional way. Typically, the GGSN 19 will be selected to be near the SGSN and/or near the RNC 13. Each SGSN stores a list of GGSNs commonly allocated when a mobile terminal activates a PDP context via the SGSN (possibly also recording the RNC 13 used by the mobile terminal). When the mobile terminal moves around the network, the SGSN used will change. Each new SGSN compares the GGSN currently used to those in its list of commonly allocated GGSNs. If the GGSN is not in its list it can be concluded that the GGSN is "non-local", and that changing the GGSN to a local GGSN would be desirable. Alternatively, the SGSN can be configured by its network operator with a table of "non-local" GGSNs.

The MME 32 may, in a similar way, store a list of community allocated PDN-GWs that it allocates when at the time of PDP context activation via that PDN-GW (possibly also recording the eNodeB used by the mobile terminal).

Generally, in 2G the distance between the SGSN in use and the GGSN determines whether a GGSN is considered to be "local". Generally, in 3G the distance between the RNC or SGSN in use and the GGSN determines whether the GGSN is considered to be "local". Generally, in SAE/LTE the distance between the PDN-GW 30 and the eNodeB in use determines whether a PDN-GW is considered to be "local".

The use of a "non-local" GGSN results in user data being routed over a longer path, leading to increased costs and latency. A method for switching from a "non-local" GGSN to a "local" GGSN would be desirable. One solution is to send a message to the mobile device that causes it to detach from the network and then re-attach and to do this during a time period in which the mobile device is not being used by the user. At re-attach, the SGSN 16/MME 32 selects a geographically appropriate GGSN 19/PDN-GW 30 in the conventional way when a PDP context is activated. Existing 3GPP TS 24.008 and 23.060 (both fully incorporated by reference) signalling and mobile terminal functionality provides for this with the Network Initiated Detach Request message being sent with Detach Type="Re-attach required".

Figure 2:
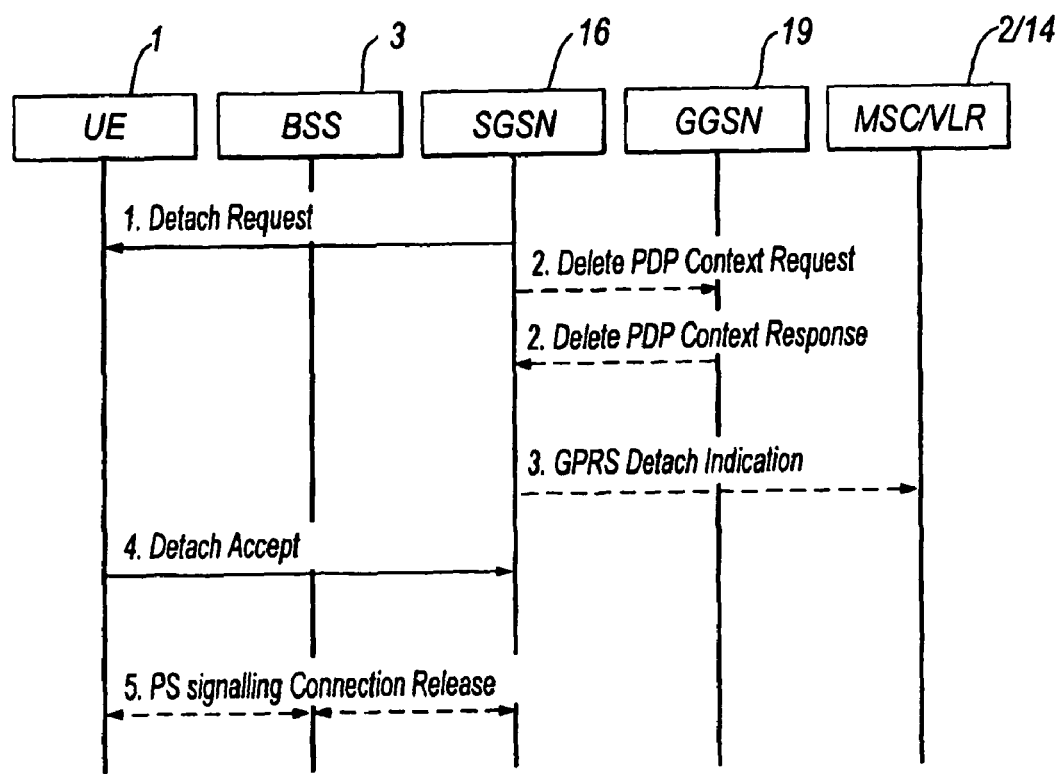
FIG. 2 shows the SGSN-initiated GPRS detach procedure in 2G/3G networks; the dotted lines indicate message exchanges that only happen if a particular condition is met, e.g. message exchange 5 only occurs in 3G.

The SGSN-Initiated Detach procedure when initiated by the SGSN 16 is illustrated in FIG. 2. The following steps are preformed:

1) The SGSN informs the UE that it has been detached, by sending Detach Request (Detach Type) to the UE. Detach Type indicates if the UE is requested to make a new attach and PDP context activation for the previously activated PDP contexts. If so, the attach procedure shall be initiated when the detach procedure is completed.
2) The active PDP contexts in the GGSNs regarding this particular UE are deactivated by the SGSN sending Delete PDP Context Request (TEID) messages to the GGSNs. The GGSNs acknowledge with Delete PDP Context Response (TEID) messages.
3) If the UE was both IMSI- and GPRS-attached, the SGSN sends a GPRS Detach Indication (IMSI) message to the VLR. The VLR removes the association with the SGSN and handles paging and location update without going via the SGSN.
4) The UE sends a Detach Accept message to the SGSN any time after step 1.
5) After receiving the Detach Accept message, if Detach Type did not request the UE to make a new attach, then the 3G SGSN releases the PS signalling connection.

However, no mechanism by which the network determines when to detach the mobile terminal is contemplated in the prior art.

According to a first embodiment of the system described herein, the SGSN 16/MME 32 is configured with a table of GGSNs/PDN-GWs that are commonly allocated by that SGSN 16/MME 32 when they activate a PDP context, so that "non-local" GGSNs/PDN-GWs for which "routing improvement" is desired can be identified. Then, if the SGSN 16/MME 32 receives a Periodic Routeing/Tracking Area Update Request from a mobile device using one of the "non-local" GGSNs/PDN-GWs, the SGSN 16/MME 32 answers with "Detach, re-attach required". This resolves the misrouteing problems for those users who have an inactivity period of greater than the PRAU/PTAU timer (e.g. >60 minutes). Sending this "Detach, re-attach required" at the time of a PRAU/PTAU gives a good probability that the user of the terminal will not be perturbed by this network action.

The first embodiment will now be described with reference to the flow charts of FIGS. 3 and 4.

Figure 3:
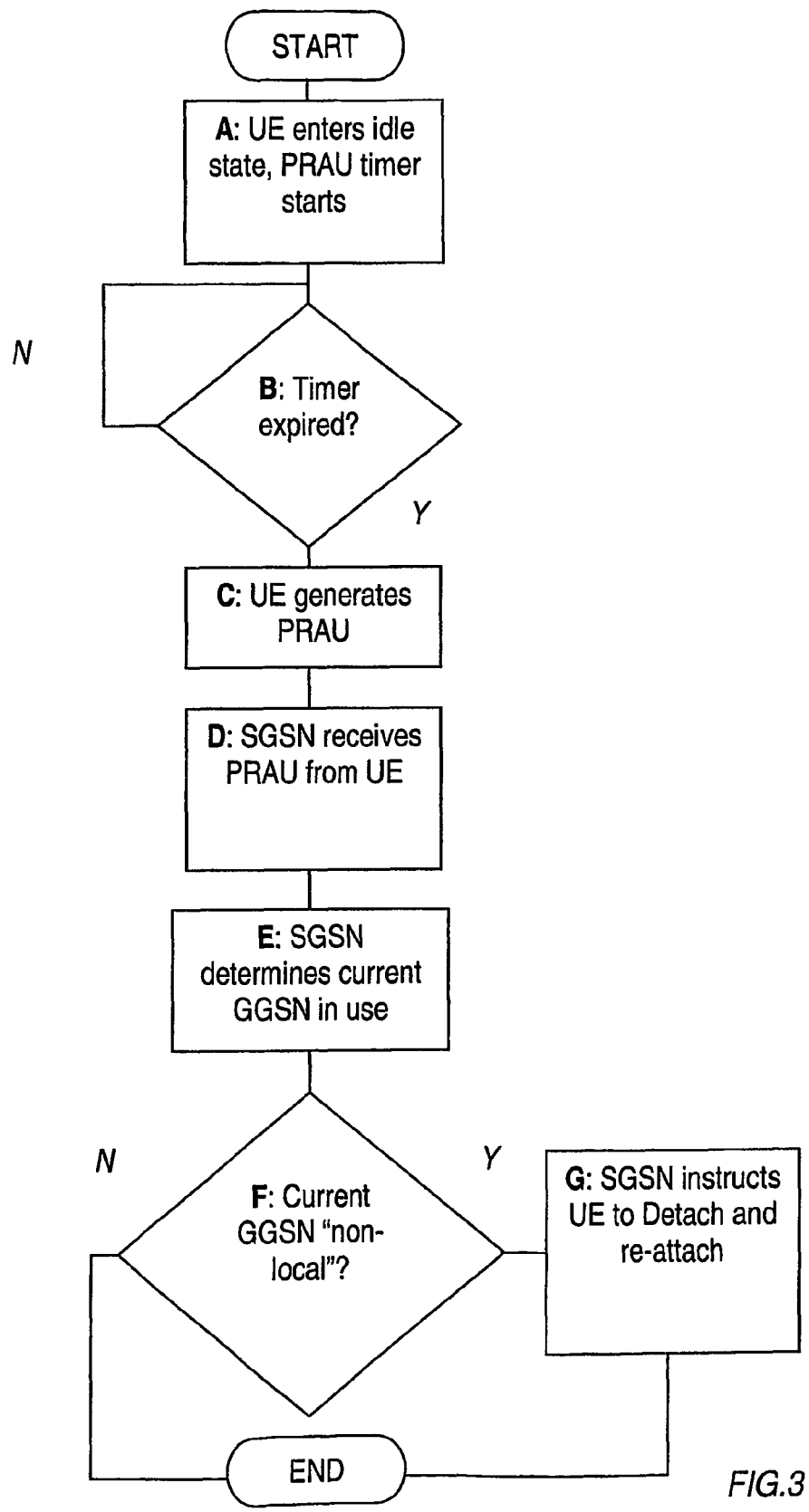
FIG. 3 is a flow chart showing the steps performed according to a first embodiment of the system described herein in the 3G Packet Switched domain.

The flow chart of FIG. 3 relates to a mobile terminal (UE) in the 3G PS domain.

Figure 4:
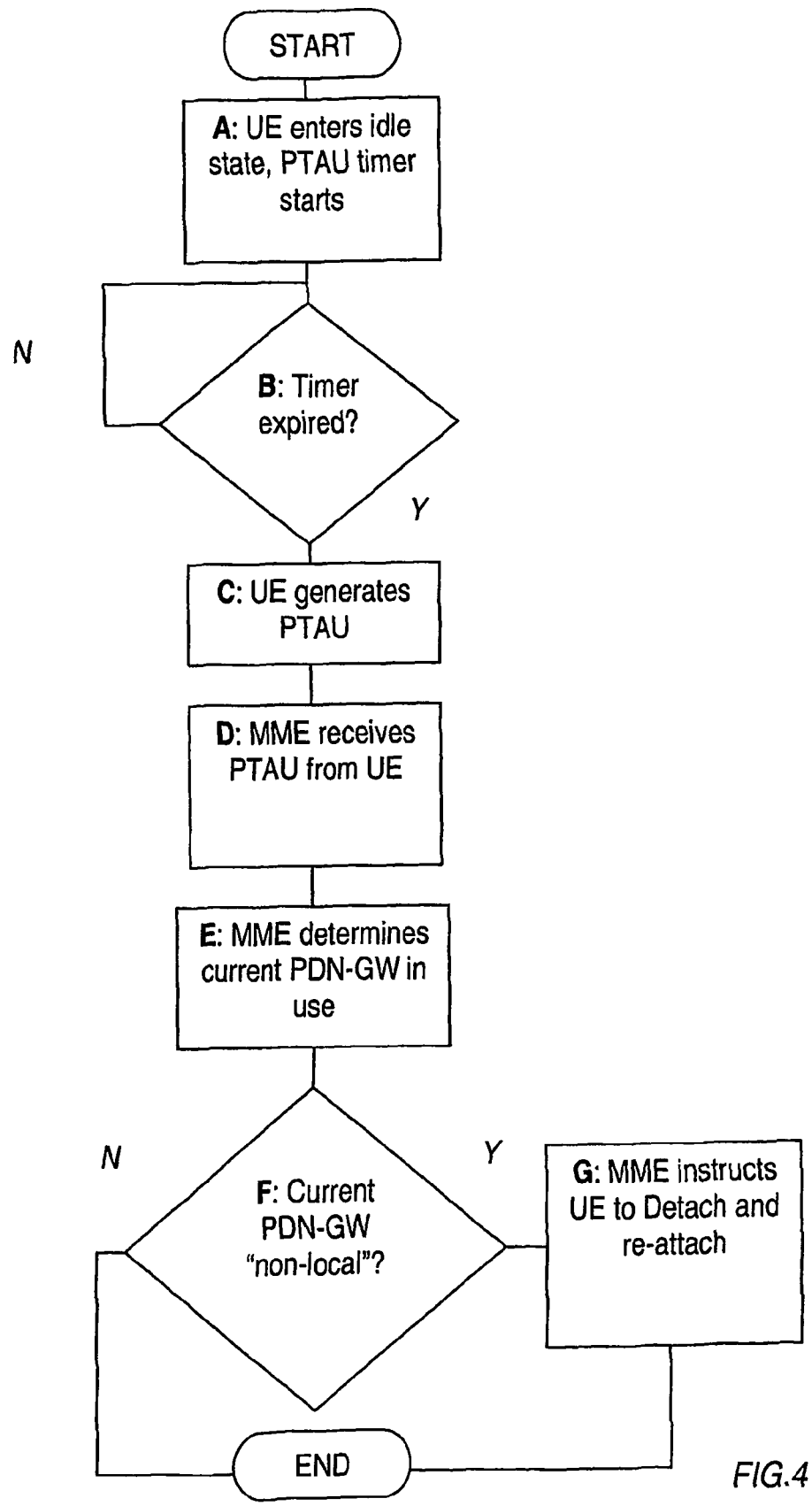
FIG. 4 is a flow chart showing the steps performed according to the first embodiment of the system described herein in the LTE domain.

The flow chart of FIG. 4 is similar to that of FIG. 3, and the same letters are used to refer to the flow chart steps. However, the FIG. 4 embodiment concerns an LTE network.

At step A the mobile terminal 1 enters the idle state and the PRAU timer starts counting. At step B it is determined whether the timer has expired. When the timer expires, the mobile terminal 1 generates a PRAU request, step C.

At step D the SGSN 16 receives the PRAU from the mobile terminal 1.

At step E the SGSN 16 determines the current GGSN 19 in use.

At step F the SGSN 16 determines whether the current GGSN 19 in use is in the table of GGSNs usually allocated by that SGSN 16 stored by the SGSN 16. If the GGSN 19 is not in the table, the SGSN 16 concludes that the GGSN 19 is "non-local".

If it is determined that the current GGSN 19 is "non-local", then step G is performed and the SGSN 16 instructs the mobile terminal 1 to detach and re-attach. The detach and re-attach procedure, in the conventional way, causes a new GGSN to be selected for communication with the mobile terminal. As mentioned above, a typical conventional way of selecting a GGSN is to select the GGSN closest to the SGSN 16 and/or RNC 13 with which the mobile terminal 1 is currently registered. Therefore, the procedure of FIG. 3 provides a mechanism by which the GGSN used by a mobile terminal 1 that is idle can be periodically updated so that the GGSN is the nearest GGSN, or one of the nearest GGSNs, to the SGSN 16 and/or RNC 13.

In FIG. 4, at step A the mobile terminal 1 enters the idle state and the PTAU timer starts counting. At step B it is determined whether the timer has expired. When the timer expires, the mobile terminal 1 generates a PTAU request, step C.

At step D the MME 32 receives the PTAU from the mobile terminal 1.

At step E the MME 32 determines the current PDN-GW 30 in use.

At step F the MME 32 determines whether the current PDN-GW 30 in use is in the table of PDN-GWs usually allocated by that MME 32 stored by the MME 32. If the PDN-GW 30 is not in the table, then the MME 32 concludes that the PDN-GW 30 is "non-local".

If it is determined that the current PDN-GW 30 is "non-local", then step G is performed and the MME 32 instructs the mobile terminal 1 to detach and re-attach. The detach and re-attach procedure, in the conventional way, causes a new PDN-GW 30 to be selected for communication with the mobile terminal 1. Similarly to the procedure for selecting a GGSN, a typical conventional way of selecting a PDN-GW 30 is to select the PDN-GW closest to the MME 32 and/or the eNodeB 26 with which the mobile terminal 1 is currently registered. Therefore, the procedure of FIG. 4 provides a mechanism by which the PDN-GW used by a mobile terminal 1 that is idle can be periodically updated so that the PDN-GW is the nearest PDN-GW to the MME 32 and/or the eNodeB 26.

As mentioned above, with SAE/LTE it has not yet been determined whether the mobile terminal will in fact perform Periodic Updates (PTAUs) with the MME 32 or perform Periodic Session Management Updates with the PDN-GW 30.

According to a second embodiment, if the mobile terminal again performs the Periodic Tracking Area Updates with the MME 32, these updates might need to be performed irrespective of whether or not there is user plane activity (the mobile terminal is in the active state). In this case (and for some other situations), the PDN-GW 30 would be the place to detect user inactivity (e.g. a pause in the transmission of data). In such a situation, the PDN-GW 30 can be configured with a list of "local" MMEs and/or eNodeBs. Then for APNs that need local routing when the mobile terminal enters to LTE-IDLE mode in a "non-local zone" (i.e. a zone not in the list), the PDN-GW can either immediately, or, upon expiry of a, probably short, timer (eg 10 seconds-10 minutes) signal to the MME 32 to get the MME 32 to detach the terminal (with cause=re-attach required).

The second embodiment of the system described herein will now be described in more detail with reference to the flow chart of FIG. 5.

At step H the mobile terminal 1 enters the LTE idle state. A timer X is started in the PDN-GW. This timer is stopped if the mobile enters Active mode, and restarted from its initial value when the mobile re-enters Idle. At step I it is determined whether that timer X has expired (for example, 10 minutes have past). When the timer X expires, step J is performed and the PDN-GW 30 determines the current MME 32 in use. At step K the PDN-GW 30 determines whether the current MME 32 is in a table of "non-local" MMEs. If it is determined that the MME 32 is in the table of "non-local" MMEs, then step L is performed, and the PDN-GW 30 instructs the Serving GW 29 to instruct the MME 32 to cause the mobile terminal to detach and re-attach. The detach and re-attach procedure will cause the MME 32 to reselect an appropriate PDN-GW 30. The system may be configured to select the nearest PDN-GW 30 on attach.

In a modification of the second embodiment, the location of the eNodeB 26 used by the mobile terminal 1 is used (additionally or alternatively to the location of the MME 32) to determine when to perform detach/re-attach of the mobile terminal 1. If it is determined that the eNodeB 26 is remote from the PDN-GW 30, then detach/re-attach of the mobile terminal 1 is performed.

In another modification of the second embodiment, when the terminal enters Idle state, the PDN-GW 30 checks whether the terminal 1 is using a non-local network node (MME and/or eNodeB). If a non-local node is being used, the PDN-GW 30 starts a (probably short) timer. If this timer expires before the mobile re-enters active mode, the PDN-GW 30 instructs the Serving GW 29 to instruct the MME 32 to detach/re-attach the terminal 1. If the mobile terminal 1 re-enters active mode, the timer is stopped and restarted from its initial value when the mobile terminal 1 re-enters idle mode.

In another modification of the second embodiment, the Serving Gateway 29 performs the detection of the use of a "non-local" PDN-GW 30. The Serving Gateway 29 can do this if the network operator configures a table of non-local PDN-Gateways, and/or a table of non-local eNodeB's and/or non-local SGSNs and or non-local RNCs. Upon detection of the use of a non-local network entity, the Serving-Gateway 29 waits until the mobile enters Idle mode. Then the S-GW 29 starts a, probably short, timer (e.g. 10 minutes). If the mobile terminal 1 does not re-enter active state before the timer expires, the Serving Gateway 29 instructs the MME 32 to detach/re-attach the terminal.

In the embodiments described above, users with continuous levels of data activity, are not re-routed. However, these users are probably only a small proportion of the total, and so, the overall impact on the network is low. If this remains a significant problem, then the Serving Gateway 29/PDN-GW 30/GGSN 19. may be configured with a list of "very remote" MMEs 32/SGSNs 16/RNCs 13/eNodeBs 26 which—when the user enters them—leads the PDN-GW 30/GGSN 16 to request the MME 32/SGSN 16 to detach (with cause=re-attach required) the user during active mode. The routeing benefits of this function have to be weighed against the negative customer experience.

Users of devices with "heart beat functions" might also not be re-routed. One example might be a Blackberry® type device. However, these devices are frequently communicating with a physically static network server, and often via a dedicated APN. For services with their own APN, the initial selection of PDN-GW/GGSN can be optimised to be close to the server, and then, relocation of the PDN-GW/GGSN when the user moves offers little or no advantage in data routeing.

Figure 5:
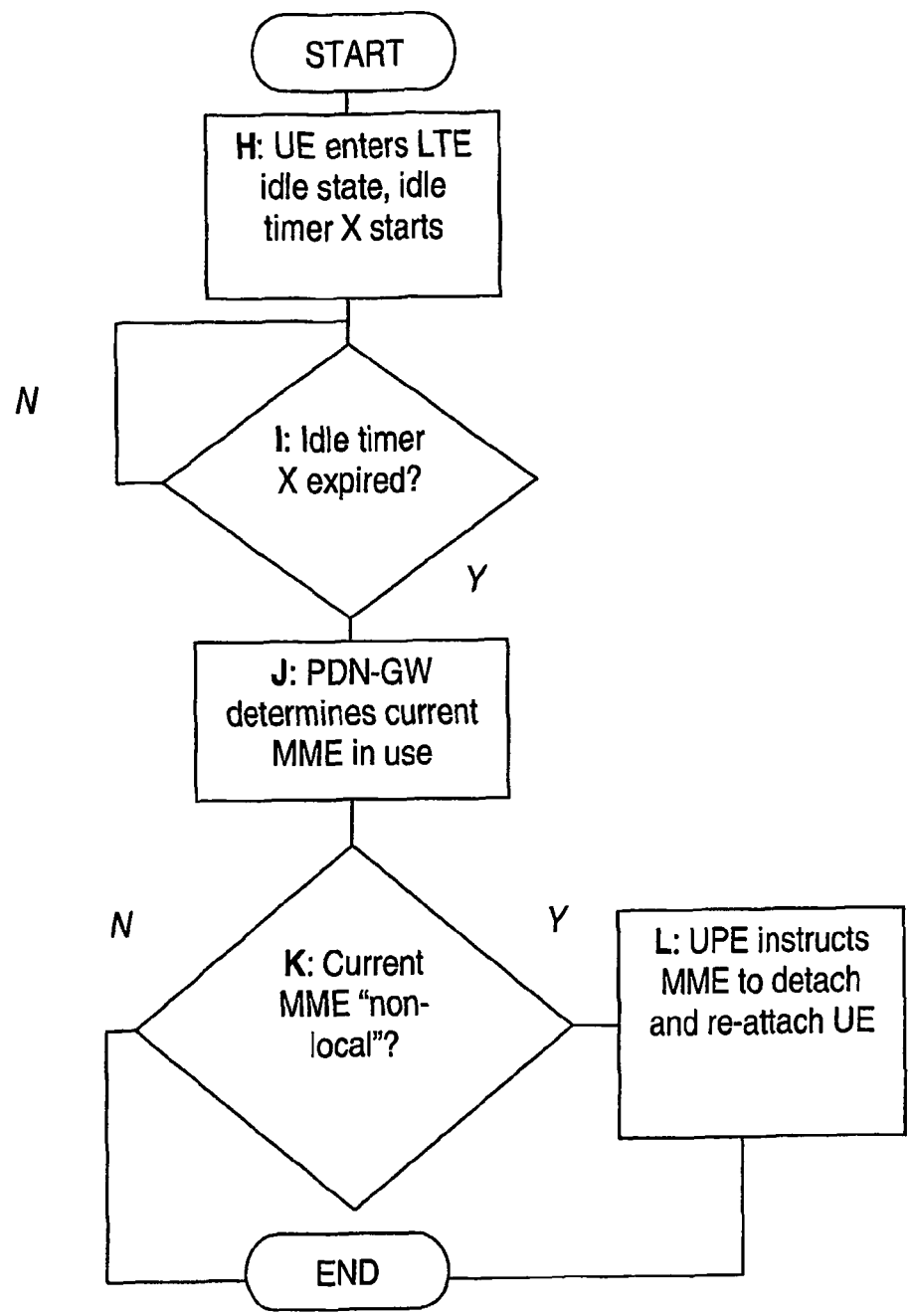
FIG. 5 is a flow chart showing the steps performed according to a second embodiment of the system described herein.

Although not shown in the flow charts of FIGS. 3, 4 and 5, the steps of those flow charts will be interrupted if the mobile terminal enters the active state and the flow chart process will start again when the idle state occurs.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A method of controlling selection of a data transmission node for a mobile device in a mobile telecommunications network including a network core and a radio access network, wherein the network core comprises a plurality of mobility management nodes and a plurality of data transmission nodes, the method comprising:

while the mobile device is attached to the network, upon determining that the mobile device is in an idle communication state for a predetermined amount of time and that the mobile device is associated with at least one non-local data transmission node, causing the mobile device to re-select at least one different data transmission mode of the plurality of data transmission nodes by instructing the mobile device to detach from the network and then reattach to the network.

2. The method of claim 1, wherein the at least one associated non-local data transmission node is determined to be non-local in dependence upon a calculation of an indication of the distance of the at least one associated non-local data transmission node from the mobile device.

3. The method of claim 1, wherein the at least one associated non-local data transmission node is determined to be non-local in dependence upon a calculation of an indication of the distance of the at least one associated non-local data transmission node from at least one of the mobility management nodes.

4. The method of claim 1, wherein the at least one associated non-local data transmission node is determined to be non-local in dependence upon a calculation of an indication of the distance of the at least one associated non-local data transmission node from the radio access network.

5. A method of controlling selection of a data transmission node for a mobile device in a mobile telecommunications network including a plurality of mobility management nodes, wherein the mobile device has an idle communication state and an active communication state, the method comprising:
   upon determining that the mobile device is in the idle communication state for a predetermined amount of time and that the mobile device is associated with a non-local data transmission node, causing the mobile device to re-select a different data transmission node by instructing the mobile device to detach from the network and then reattach to the network.

6. A method of controlling selection of a data transmission network node for a mobile device in a mobile telecommunications network including a plurality of mobility management nodes, the method comprising:
   when the mobile device moves from being registered in a first one of said mobility management nodes to being registered in a second one of said mobility management nodes, determining at the second one of the mobility management nodes to cause the mobile device to reselect the data transmission network node by instructing the mobile device to detach from the network and then reattach to the network, upon determining that the mobile device is in an idle communication state for a predetermined amount of time and that the mobile device is associated with a non-local data transmission mode.

7. The method of claim 5, wherein the associated non-local data transmission node is determined to be non-local in dependence upon a calculation of an indication of the distance of the associated non-local data transmission node from the mobile device.

8. The method of claim 5, wherein the associated non-local data transmission node is determined to be non-local in dependence upon a calculation of an indication of the distance of the associated non-local data transmission node from at least one of the mobility management nodes.

9. The method of claim 1, wherein the step of determining whether the mobile device is associated with the non-local data transmission node is performed in response to an area update request received at a mobility management node associated with the mobile device.

10. The method of claim 1, wherein the mobile device is associated with a particular mobility management node of the plurality of mobility management nodes, and wherein the associated non-local data transmission node is determined to be non-local with reference to a table of data transmission nodes commonly allocated by the particular mobility management node.

11. The method of claim 10, wherein the determination is performed by the particular mobility management node or another core network node.

12. The method of claim 1, wherein the mobile device is associated with a particular mobility management node of the plurality of mobility management nodes and is caused to be connected to the different data transmission network node by the particular mobility management node instructing the mobile device to detach from the network and to re-attach to the network.

13. The method of any claim 1, wherein the determining step is performed in response to the mobile device being idle for a predetermined time period.

14. The method of claim 1, wherein the radio access network comprises at least one of: a node B and an eNode B.

15. The method of claim 14, further comprising:
   upon the mobile device entering the idle communication state, activating a user inactivity timer usable to trigger the reselection.

16. The method of claim 1, wherein the at least one data transmission network node comprises a GGSN.

17. The method of claim 1, wherein the determination that the mobile device is associated with the non-local data transmission node is performed by the non-local data transmission node.

18. The method of claim 17, wherein the determination is performed with reference to a table of non-local mobility management nodes.

19. The method of claim 1, wherein the determination step determines whether the routing of the data via the at least one data transmission network node is optimal.

20. The method of claim 1, wherein the determining step generates an indication of whether the at least one data transmission node is more remote from at least one of: one of the mobility management nodes and from other data transmission nodes used by the mobile device than corresponding mobility management nodes/data transmission network nodes available for use by that mobile device.

21. A mobile telecommunications network, comprising:
   a network core;
   a radio access network, wherein the network core comprises:
      a plurality of mobility management nodes; and
      a plurality of data transmission nodes; and
   a determining device that, upon determining that the mobile device is in the idle communication state for a predetermined amount of time and is associated with at least one non-local data transmission node, causes the mobile device to re-select at least one different transmission node of the plurality of data transmission nodes by instructing the mobile device to detach from the network and then reattach to the network.

22. The network of claim 21, wherein the determining device determines whether the at least one associated non-local data transmission node is non-local in dependence upon a calculation of an indication of the distance of the at least one associated non-local data transmission node from the mobile device.

23. The network of claim 21, wherein the determining device determines whether the at least one associated non-local data transmission node is non-local in dependence upon a calculation of an indication of the distance of the at least one associated non-local data transmission node from at least one of the mobility management nodes.

24. The network of claim 21, wherein the determining device determines whether the at least one associated non-local data transmission node is non-local in dependence upon a calculation of an indication of the distance of the at least one associated non-local data transmission node from the radio access network.

25. The network of claim 21, wherein the mobile device is associated with a particular mobility management node, and wherein the associated non-local data transmission node is determined to be non-local with reference to a table of data transmission nodes commonly allocated by the particular mobility management node.

26. The network of claim 21, wherein the determining device causes the mobile device to be connected to the different data transmission network node by the mobility management node instructing the mobile device to detach from the network and to re-attach to the network.

27. The network of claim 21, wherein the determining device causes the reselection after the mobile device has been in the idle communication state for a predetermined time period, and wherein the determining device is further configured to activate a user inactivity timer to measure the predetermined time period.

28. The network of claim 21, wherein the radio access network comprises at least one of: a node B, an eNodeB, GGSN, a PDN-GW and a Serving-GW.

29. The network of claim 21, wherein the determination device determines whether the routing of the data via the at least one data transmission network node is optimal.

30. The network of claim 21, wherein the determining device generates an indication of whether the at least one data transmission node is more remote from at least one of: one of the mobility management nodes and from other data transmission nodes used by the mobile device than corresponding mobility management nodes/data transmission network nodes available for use by that mobile device.

31. The method of claim 6, wherein the associated non-local data transmission node is determined to be non-local in dependence upon a calculation of an indication of the distance of the data transmission node from the mobile device.

32. The method of claim 6, wherein the associated non-local data transmission node is determined to be non-local in dependence upon a calculation of an indication of the distance of the data transmission node from at least one of the mobility management nodes.

* * * * *